United States Patent

Burton et al.

[15] 3,645,619
[45] Feb. 29, 1972

[54] DOCUMENT CAMERA SYSTEM

[72] Inventors: John S. Burton; Samuel Gilman; Michael Rothbart, all of Los Angeles; Ronald L. Whitney, San Fernando, all of Calif.

[73] Assignee: Terminal Data Corporation, Van Nuys, Calif.

[22] Filed: May 5, 1970

[21] Appl. No.: 34,671

[52] U.S. Cl. ................... 355/40, 95/1.1, 226/37, 226/45, 328/72, 355/50, 355/64, 355/71
[51] Int. Cl. ........................................................ G03b 15/00
[58] Field of Search ............... 355/64, 40, 41, 50, 71, 39; 95/1.1; 226/27, 33, 45; 328/72, 75

[56] References Cited

UNITED STATES PATENTS

| | | | |
|---|---|---|---|
| 2,194,808 | 3/1940 | Pooley | 355/50 X |
| 3,516,741 | 6/1970 | Thaddey | 355/41 X |
| 3,395,629 | 8/1968 | Salvesen | 95/1.1 |
| 3,357,326 | 12/1967 | Hunstiger | 355/4 |
| 3,031,118 | 4/1962 | Frommer | 328/72 X |
| 3,354,774 | 11/1967 | Smitzer | 355/64 X |
| 3,443,867 | 5/1969 | Scheffel | 355/64 X |
| 3,493,301 | 2/1970 | Sable | 355/64 |
| 3,495,267 | 2/1970 | Brodie | 95/1.1 X |
| 3,528,355 | 9/1970 | Blaekert | 355/64 X |

Primary Examiner—Samuel S. Matthews
Assistant Examiner—Michael Harris
Attorney—Harry R. Lubcke

[57] ABSTRACT

A filmstrip-recording system for making optical exposures upon film of documents translated by a belt in continuous motion. The film is rapidly started and stopped for each exposure. The exposure is made while the document and the film are both moving synchronously. Indicia having positional significance are applied while the film is in motion, and indicia having human-readable significance are applied while the film is stationary. Under the control of a coactive computer, documents are selectively sensed for recording or for not recording, and as to the specific identity of the human-readable indicia that shall be applied. Electronic timing and control circuits, including ramp function elements, are employed to achieve approximately an order of magnitude greater speed of operation than state of the art devices.

12 Claims, 7 Drawing Figures

DOCUMENT CAMERA SYSTEM

BACKGROUND OF THE INVENTION

This invention pertains to the optical recording of documents upon a film strip, along with indicia having to do with each document.

Prior art is to be found in expired patents, which disclose the broad aspect of recording a series of documents upon a film strip. These recorders of 30 and 40 years ago employed essentially all-mechanical means. The speed of operation was relatively slow.

Subsequently, recorders for photographing bank checks were evolved. These operated more rapidly, but employed at least all-mechanical feeders, which still restricted the speed of operation. The field has been essentially dormant for the last 10 years.

BRIEF SUMMARY OF THE INVENTION

The present system employs new combinations of both mechanical and electrical elements and operates, say, five times faster than prior art devices. The electrical elements transcend the simple switches of the prior art and include ramp timing circuits and other sophisticated controls. These include, if desired, an electronic computer to coact with the mechanical elements to obtain near-instantaneous choice in handling and/or imposing indicia with the image of the document on the film record.

Where previously a simple sequential mechanical counter was all that was available to produce indicia for identifying the recorded documents; presently any indicia, sequential or computer-selected from information it contains, can be sufficiently rapidly selected in an electronic manner to be impressed upon the film carrying the exposure of the document.

In a similar extremely rapid manner decisions can be made by the computer as to whether a given document being transported in the system shall be recorded on the film or not recorded on the film. Thus, editing is possible and is accomplished by suitably programming the computer. Moreover, further editing is made possible in retrieval. The memory of the computer may be supplied with the digital equivalent of the identifying indicia in the recording process according to this system.

In recording, the film does not move during the time interval when the film spaces between documents are translated across the field of view by the belt translator. Thus, each exposure takes place de novo, and if one or more documents are not to be recorded the film is not moved for an even longer interval.

A simple indicium or mark is recorded, having positional accuracy to a high degree. This is accomplished while the film is moving at synchronous speed. Human-readable indicia are recorded adjacent to each exposure of a document upon the film. Being electrically generated, this may be stored in a suitable electrical device, such as the memory or tapes associated with the computer, as an electrical signal, typically of digital form.

An electrically operated shutter opens for each exposure sequence. It has a delay circuit which causes it to remain open during usual operation of the system, but to close after an interval, say of one second, to prevent fogging of the film.

The presence of a document to be recorded must be detected prior to the time it reaches the exposure station of the transport system. This allows a brief time interval for energizing many elements of the camera, including starting motion of the film. It has been determined that an electrical ramp function with a voltage comparator to terminate the ramp has numerous advantages over other mechanical or electrical arrangements. This is particularly true when the camera system is arranged to record documents at more than one speed of translation, of the belt.

DESCRIPTION OF THE PREFERRED EMBODIMENTS

Figure 1:
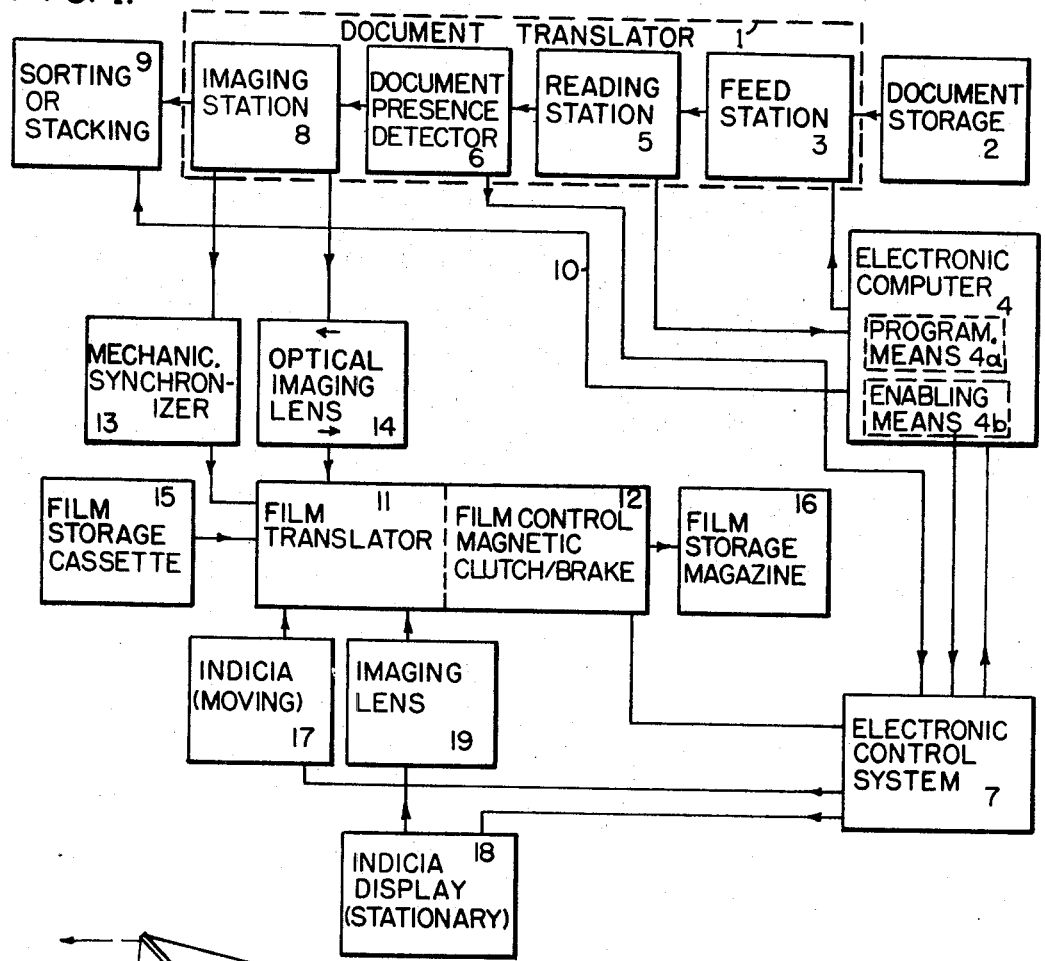
FIG. 1 is a block diagram of the document camera system.

In FIG. 1 document translator 1 is a traveling belt apparatus that is known in general in the art. Typical documents may include gasoline purchase tickets and other types of sales slips, as well as IBM cards; although relatively any type or size of information-containing entity may be processed by the system of this invention. From a known type of storage facility 2 documents are conveyed to feed station 3, wherein upon command from electronic computer 4, or in any continuous sequential manner, the documents are entered between the moving belts of the document translator. Suitable feeding means may be the oscillating platen or rubber roll type.

The documents next encounter reading station 5, there to determine which documents are "good" and which are "bad." That is, which documents have all required data present with sufficient clarity to be read and which documents lack data or are illegible. As is known, the reading station may be of the type to optically read numbers or alpha-numeric information, particularly Gothic characters. It may also be of the magnetic ink character recognition (MICR) type as used on bank checks; of the mark-reading-type capable of reading pencil marks; or of the punched hole type for IBM cards or equivalent.

The information that is read is conveyed to computer 4, for comparison with information within a programmable memory or other programmed information within the computer, to originate commands for subsequent control of the system as to whether the document will or will not be exposed upon the film. For example, if the reading station cannot read the card the computer arranges for its rejection; if the card should be out of a prescribed order it might also be rejected; or if the card is not according to a predetermined collation with which the computer has been programmed, it will be rejected. An example of the latter would be a programmed order to accept and record by exposure on the film only those documents that represent a transaction of greater than 5 dollars. The inhibition by the computer may be accomplished by the absence of a gating signal from the computer to associated control apparatus at the otherwise appropriate time.

As indicated in FIG. 1 the document next passes through document presence detector 6. While this is the usual sequence, the positions of entities 5 and 6 may be interchanged, with appropriate modification of the timing sequences concerned with the document presence detector. The document presence detector may have any form suited to give an electrical signal upon a document being present and being carried along by the belt system. Typically, this is a phototransistor, a known device, in combination with an amplifier; which arrangement provides a signal as long as a document is present at the station. A source of illumination is arranged to impinge upon the phototransistor, avoiding the belt as to the optical path; being interrupted only by the fully or relatively opaque document. Both the leading and the trailing edge transitions of the electrical signal are important, as provided by the presence detector, since electrical ramp functions vital to the timing of operations of the remainder of the system are inaugurated by these transitions.

Figure 2:
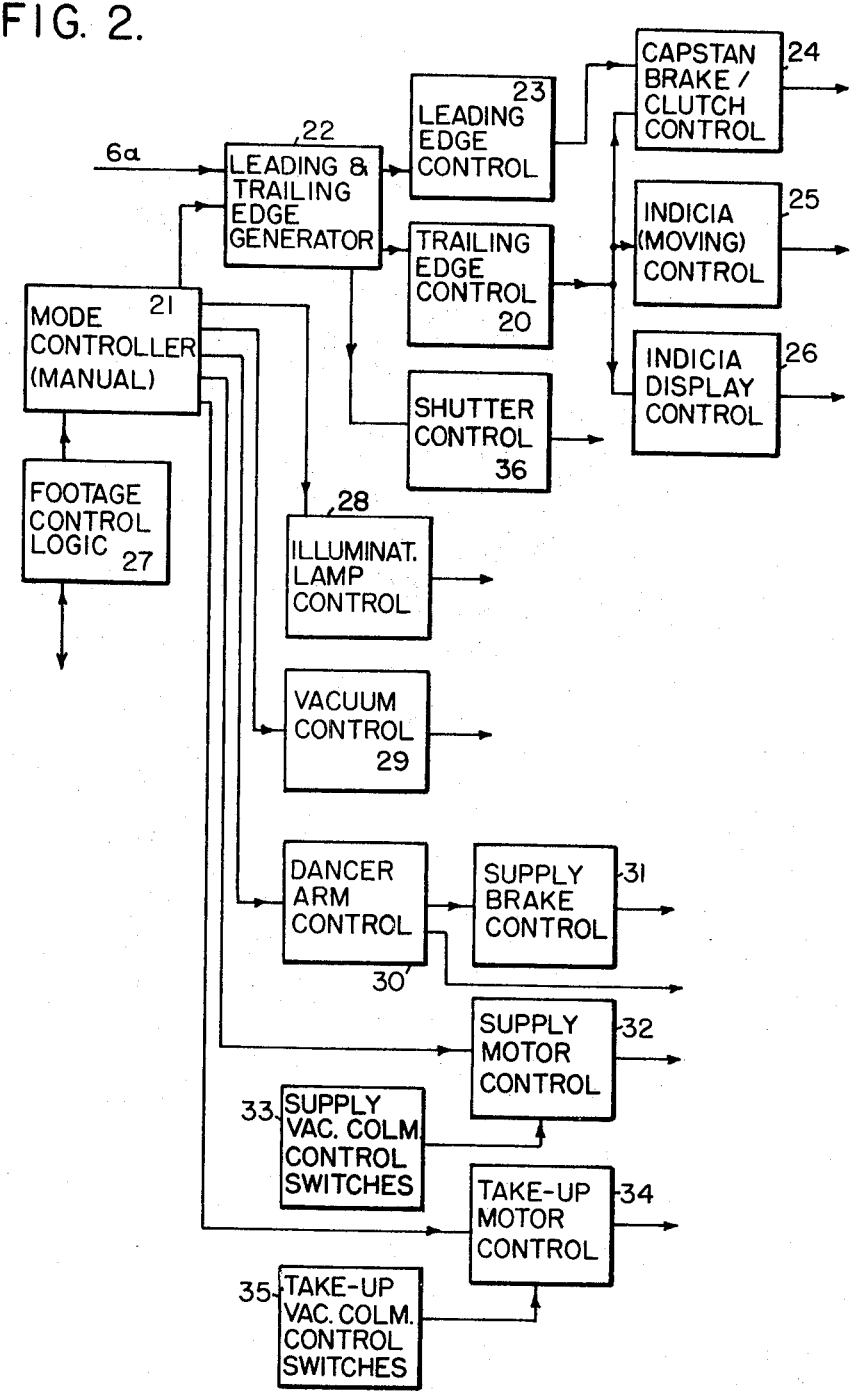
FIG. 2 is a block diagram of the electronic control system represented in FIG. 1.

The output of document presence detector 6 connects directly to electronic control system 7, which latter is detailed in FIG. 2.

The document itself continues along the path of the belts to imaging station 8. This is provided with illumination and a gap in the path of the belts so that either or both sides of the document may be exposed upon the recording film.

Sorting or stacking entity 9 may be of the known type in which the documents are stacked in two stacks; one of documents that have been recorded and one of rejects. If sorting is accomplished, this may involve 10 or 12 bins, corresponding to information that was read off of the document involved. Electrical connection 10 connects computer 4 to stacking entity 9, so that suitable disposition according to the information from reading station 5 can be accomplished.

Figure 3:
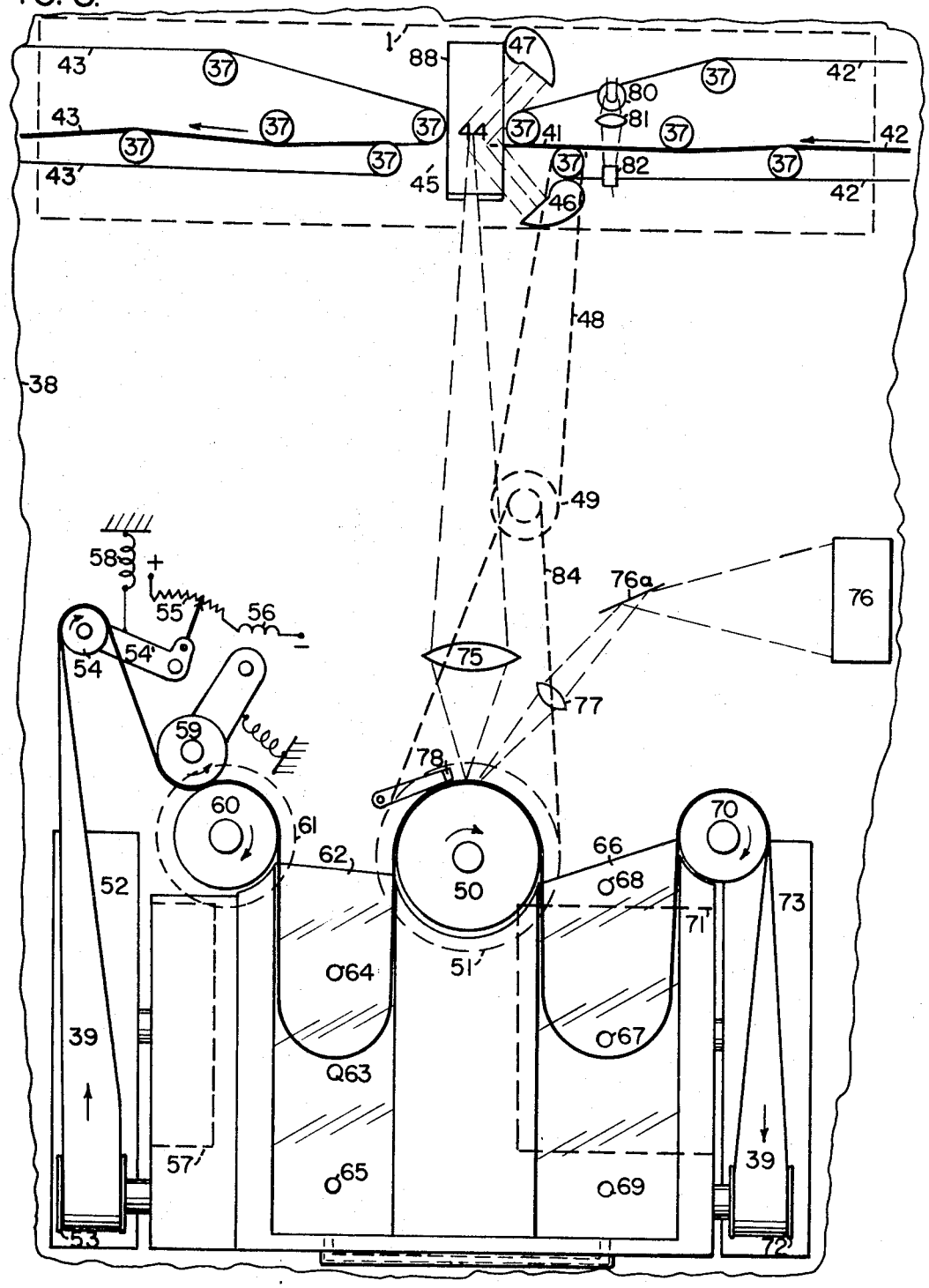
FIG. 3 is a plan view of the mechanical means to record.

Film translator 11 is the main device for handling the film to be exposed by images of the documents. It includes film control magnetic clutch/(and) brake assembly 12. Mechanical synchronizer 13 drives film translator 11 from the belt system of document translator 1. The exposures upon the film in translator 11 are invariably at reduced scale with respect to the original documents. This is usually of the nature of microfilm technique and a reduction in size may be 32 to 1. With such a reduction a corresponding reduction of the speed of the film through the film translator must be accomplished with respect to the speed of the documents through document translator 1. This is accomplished in synchronizer 13, one embodiment of which is shown in FIG. 3, to be later described. Of course, an electrical velocity servo may replace the mechanical synchronizer shown herein, at greater cost.

Optical imaging lens 14 forms an image of the illuminated document upon the plane of the film in film translator 11; this image typically being reduced in size by 32 times as has been mentioned. This is accomplished by placing lens 14 considerably closer to the film than to the document, in accordance with elementary optics. Since only a single lens is required (and an even number of mirrors is employed) the motion of the image is in the opposite direction from that of the document object; hence the opposite directions of belt and film as shown by the arrows in FIG. 1, and the structure in FIG. 3.

Typically, the film employed in this system is of the nonperforated type and is frictionally driven by a capstan. Attached thereto is the clutch/brake mechanism 12. This may be of the magnetic type and acts to rapidly accelerate, drive and then rapidly decelerate the film in this system. The film path is more fully set forth in FIG. 3, and includes additional elements required in the precision handling of film.

Film storage cassette 15 is exemplary of a source of film and film storage magazine 16 is exemplary of means to accept the exposed film. Usually, silver halide film with wet processing is used; however, dry silver imaging film, and others, such as diazo, or free radical, with development by wet solutions, ammonia gas, heat, or other means to bring out the latent image, may be used.

In coacting with an electronic computer it is essential, or at least highly desirable, that there be two indicia impressed upon the film for each exposure thereon of a document. A simple indicium, typically having a bar shape and impressed upon the film in translator 11 while the film is in full motion, is provided by moving indicia entity 17. This is exposed upon the film by means which are placed ahead of the optical imaging gate in film translator 11 and may be a small solid state lamp suitably energized from electronic control system 7. This indicium is accurately related to the position of the image upon the film by the action of electronic means to be described in connection with FIG. 2.

The second indicia are produced by display 18. These are impressed upon the film when it is stationary in the preferred embodiment being described. The display takes the form of very rapidly energizable gaseous or solid state lamps forming numerals or other human-readable indicia, which are images on the film by imaging lens 19. This image is formed behind the optical imaging gate in film translator 11, considering the direction of motion of the film. The desired indicia are formed in display 18 by electronic logic in electronic control system 7. Specific information as to the content of the indicia, such as a customer's account number, is provided from electronic computer 4; or a counter is powered to serially number the successive exposures on film translator 11.

In view of the high speed of operation possible with the system of this invention certain operations are carried out by relatively inertialess electronic means, and electromechanical interfaces utilize electrical "forcing circuits" to minimize mechanical inertia. Speeds of 200, 300 and 400 inches per second for the belt in document translator 1 are attainable. This corresponds to handling 1,200, 1,800 and 2,400 representative documents per minute and makes it possible for this system to keep in step with present-day electronic computers.

The direction of flow of information is given on each connecting line in FIG. 1 by an arrow. Electronic computer 4 is normally used to supervise and otherwise command the operation of the whole system and the system is required to have structural and performance capabilities to allow this interaction. However, the system is capable of self-operation in the absence of computer control through the functioning of electronic control system entity 7. In such an instance the readable indicia are usually serial.

Fig. 2 is a block diagram of what comprises the electronic control system 7 of FIG. 1.

Mode controller 21 contains the manual controls, pushbuttons, thumbwheel switches, indicators, and so on, required to accomplish overall control of the system, particularly as to turning the same "on" and "off." Certain electronic circuits are also contained therein, such as a known serial counter for numbering exposures in the absence of an override control from computer 4.

Particularly significant in FIG. 2 is the leading and trailing edge generator 22. Initiating enablement thereof is provided from the output of document presence detector 6 of FIG. 1, which is represented by the incoming line 6a in FIG. 2. A stepfunction pulse on line 6a signifies that the leading edge of a document has just entered the detector 6 station. This is located a distance from the leading edge of the photographing aperture, such as 4 inches; a dimension that is determined and fixed by the mechanical structure of the document translator. For any selected belt translation speed a specific time interval will obtain from the time of occurrence of the step function to the arrival of the leading edge of the document at the photographing aperture. Numerous system functions are activated within this interval, which is typically 14 milliseconds (ms.), as will be later pointed out.

An advantage of the electronic control of this invention is that the timing interval can be adjusted for predetermined speed of operation by terminating ramp functions that are involved at predetermined electrical values. That is, at voltage levels corresponding to the time interval desired. This information is set in mode controller 21 prior to any sequence of operation and is circuit-connected to generator 22 by the connection shown, which is generic in character and is comprised of more than one conductor.

The pulse from detector 6 persists as long as the document is passing through this station; thus, the initial step of the waveform from the zero axis corresponds to the arrival of the leading edge of the document, while the terminal step of the waveform back to the zero axis corresponds to the departure of the trailing edge of the document.

Within generator 22 a flip-flop (*ff*) is set by the leading edge. This starts a linear ramp in the leading edge control 23. An operational amplifier with external feedback generates a very stable and linear ramp. A voltage comparator, which may be in the form of an integrated circuit, is driven by the ramp device and when a predetermined (positive) voltage is reached the comparator is driven "true," giving an output pulse. These circuits are detailed in FIG. 7.

At a specific time prior to the arrival of the document at the photographing aperture, such as 1½ ms., a "true" output goes to capstan brake/clutch control 24. This turns the capstan brake "off" and the capstan clutch "on." A power amplifier capable of supplying a current of the order of 3 amperes through a forcing circuit is employed to accomplish rapid operation of these mechanical elements.

The film accelerates and 7½ ms. later it is at full speed. It then travels at uniform velocity, the value of which is inversely proportional to the demagnification ratio of the optics for imaging the documents. For a 32 times reduction in size of the image with respect to the size of the document, this is one-thirtysecond as fast as the velocity of the document belt; i.e., 12½ inch/sec. for 400 inch/sec. belt speed.

When the tailing edge of the document passes through the document presence detector 6 at a trailing edge flip-flop is set and is gated to trailing edge control 20. This starts a trailing ramp therein, which drives a trailing voltage comparator. The pulse output from the latter reverses the sequence in control 24; i.e., turns the brake "on" and the clutch "off." Control 20 is connected to control 24 to accomplish this, as seen in FIG. 2.

A second ramp in trailing edge control 20 drives a second voltage comparator, which turns "on" moving indicia lamp 17 of FIG. 1 a given interval before the trailing edge passes by the aperture. This is typically 0.080 inch before the trailing edge and is accomplished through indicia (moving) control 25.

The trailing ramp in the trailing edge control 20 turns "off" the indicia (moving) lamp after a fixed delay, the length of which is determined by the speed of translating the documents. This turn "off" is made to occur at the trailing edge of the document. The fixed length mark provides a position index for the image exposed of the document on the film. The center of this length of mark is typically used for positioning in subsequent reproducing apparatus (not a part of this invention).

A third ramp in trailing edge control 20 then comes into play through its accompanying voltage comparator and turns "on" the stationary indicia lamps through indicia display control 26.

A fourth ramp in trailing edge control 20 is triggered "on" by the third ramp when it turns "on." The fourth ramp and voltage comparator are constituted to have a duration adjustable around 6 ms., depending upon the exposure speed of the film employed. This causes the illuminating elements of indicia display 18, of FIG. 1) to remain "on" for this period of time. The fourth ramp acts to turn them "off" and also to reset the flip-flop in leading and trailing edge generator 22.

Assuming that computer 4 is not controlling the numbering of the stationary indicia display, the fourth ramp also up-dates the electronic sequential counter, which is internal to the camera system and is located in mode controller 21.

The arrowed connections to the right of controls 24, 25 and 26 connect to the corresponding named elements in FIG. 1; i.e., indicia (moving) control 25 to indicia (moving) 17 in FIG. 1. The same scheme is used for the further controls to be discussed below.

With the gaseous lamps having seven bars as mentioned, this sequential counter may be a known type of integrated circuit (IC) decade counters. The outputs thereof drive seven bar logic decoders, such as a Fairchild, or the Texas Instruments SN7446N devices, which in turn drive the seven bar lamps.

In a practical embodiment of this invention a footage counter plays a significant role, since it is possible to expose images of documents with corresponding indicia on one-half of the width of the film and then turn it end for end and expose an equal number of further images on the other half.

In FIG. 3 the footage counter is element 70. It has a magnetic pickup element adjacent to it and a magnet embedded in the rotating pulley. This gives one magnetically produced electrical pulse per revolution. This is an input to footage control logic 27 of FIG. 2. Pulley-capstan 70 is made of such a size as to have a circumference of 4 inches. Thus, three revolutions thereof represents twelve inches, or one foot, of film having passed by. In the footage control logic 27 there is a divide-by-three circuit, typically two flip-flops connected together, which gives one output pulse for three input pulses. Thus, one pulse is available for each foot of film passed by, to operate an indicating footage counter. This is an "up-down" human-readable counter. A set of thumbwheel switches are also provided, into which the number of feet of film in a full cassette or reel as employed is manually set. These switches are electrically connected to logic gates in footage control 27, which are also connected to the counter. When the footage counter and the switches are in coincidence an "end of film" warning light lights and 20 feet before this a "low-film" light lights. When the film is turned over for the second series of exposures the counter decreases in count, giving a warning at zero feet on the counter and also another "low film" warning 20 feet before zero feet is reached. The thumbwheel switches are on the front control panel of mode controller 21.

Illuminating lamp control 28 is typically a 250 watt 105 to 115 volt DC supply. It receives "on-off" control from mode controller 21. The output of this supply is controlled by feedback to provide constant illumination throughout the life of the lamp and for any other variations tending to change the illumination of the film during exposure. A photovoltaic cell receives illumination from the exposing lamps that light the documents. An integrated circuit is connected thereto and to 1 triac, which it triggers. As the illumination lamp intensity decreases the DC reference voltage initiated by the photovoltaic cell decreases and the triac triggers lower on each excursion of the alternating current waveform which provides the DC for the lamps after rectification. Since the voltage upon the lamps is thus incrementally increased, the illumination therefrom remains constant.

Continuing in FIG. 2, vacuum control 29 accepts a command to turn the vacuum "on" or "off" from mode controller 21. The "off" command is for loading or unloading film or for "fast forward." The latter activity is for rapidly traversing the film to be wholly contained within one cassette, such as when there is unexposed film remaining in the camera and no more exposures are to be made on that reel.

Control of the vacuum is accomplished by a solenoid valve which serves both supply and takeup vacuum chambers. The solenoid is actuated by an integrated circuit amplifier within vacuum control 29, which merely accepts an electrical input command from mode controller 21 and actuates the solenoid after amplifying that input. Manual switches for "unload," "fast forward," etc. originate the electrical commands.

Dancer arm control 30 takes an electrical output from a rheostat 55, which is attached to the arm carrying dancer roller 54 in FIG. 3. This control controls supply brake control 31, which, in turn, adjusts current through supply brake 57. This brake is mechanically attached to the film supply cassette and provides nominal tension on the roll of supply film.

Supply motor control 32 has start-up and shutdown control exerted upon it from manually operated switches in mode controller 21. Control while the system is operating is provided by supply vacuum column control switches entity 33, which is connected to switch 63 in FIG. 3. The normal length of the supply loop of film is in the vicinity of this vacuum-operated switch. When the loop becomes too long the air pressure at the switch raises, operating the switch, and when the loop becomes too short the air pressure at the switch lowers, operating the switch in the opposite manner, to close it and thereby turn "on" supply motor 61.

Takeup motor control 34 and takeup vacuum column control switches entity 35 are constituted the same as their supply counterparts, but are connected in the opposite manner, so as to turn "off" takeup motor 71 when the takeup vacuum column loop is too short.

Shutter control 36 includes a retriggerable one-shot that is given a series of pulses from leading and trailing edge generator 22, one pulse for each document passed. This series of pulses maintains a "low" output from the one-shot, which turns "on" an amplifier connected to the one-shot and passes current to shutter solenoid 95 of FIG. 5. This retracts the shutter;

i.e., moving it out of the path of light that conveys the image of each document to film 39.

According to the characteristic of a retriggerable one-shot, as long as document pulses arrive more frequently than one per second the one-shot will remain triggered and the shutter is retracted. This takes place during normal operation, since at an average speed of operation of 300 inches per second belt speed 30 documents are processed per second. When operations cease for more than 1 second the internal time constant of the one-shot expires and the output goes "high," turning the amplifier "off," blocking current to the shutter solenoid, and shutter spring 97 causes shutter blade 96 to intercept the path of light. This prevents fogging the film during periods of long inactivity.

FIG. 3 is a plan view of the mechanical means to record; in effect, all mounted upon base plate 38. This may be of aluminum, hard anodized and polished, being extremely flat and rigid, with a thickness within the range of from one-half to three-quarter inch. It is not required that the document translator 1, shown at the top, be mounted on this one plate, but the two mechanisms must be rigidly fastened together to retain optical precision.

Only the central part of document translator 1 is shown in FIG. 3, the other elements shown in FIG. 1 being shown and not required to be detailed. A document 41 is seen in a position prior to being photographed. The direction of motion of the documents is from right to left. The document is held between two endless belts having the common designation 42, lying together along the document path, but returning above and below that path. Such positioning is accomplished with the aid of plural rollers 37. The path of belts 42 terminates to the right of imaging gate 44, while a second "mirror-image" belt arrangement 43 starts to the left of gate 44. The document passes from one belt to the other without difficulty and the arrangement allows both sides of the document to be photographed, if desired. Since both the document and the film being exposed are moving together, only a vertical slice of the document need be revealed. Thus, the width of imaging gate 44 is of the order of one-quarter to one-half inch. Document illuminating lamp-reflector assemblies 46 and 47 are placed in front and in back of the gate and direct relatively strong illumination to it. With documents traveling at 400 inches/second the mechanism works extremely fast and the time for exposure is relatively short. If only one side of the document is being imaged, then only lamp 46 or 47 is energized by mode controller 21, upon manual setting. Either side of the document is imaged by a mirror assembly 45, of which a top mirror 88 is seen in FIG. 3. The assembly is shown in detail in FIG. 4.

Selected ones of pulleys 37 are driven together underneath plate 38 by timing belts (not shown), so that the whole belt system operates in synchronism. Such pulleys as are not driven act as idlers, driven by the belt in contact with the pulley, but this does not affect the synchronism. From a particular driven pulley 37', an additional pulley and a belt 48 extend below the plate. Belt 48 wraps around the larger of two pulleys of compound pulley 49. Belt 84 wraps around the smaller of the two pulleys of the compound pulley and also around pulley-flywheel 51, the latter being attached to the shaft of drive capstan 50. This pulley-belt combination gives the speed reduction corresponding to the optical reduction in size of the image on the film as compared with the size of the original document. This is 32 to 1 in the typical example being considered. Normally, flat belts properly tensioned are employed.

In the camera assembly itself film 39 is fed out of supply cassette 52 over a direction-reversing roller 53 and over dancer roller 54. The latter is provided with a pivoted arm 54', to which is attached the wiper arm of rheostat 55. As arm 54' moves up and down according to the slack of the film 39, the position of the arm of the rheostat is changed. The rheostat is electrically connected to coil 56, which is the electrical energizing means for supply brake 57. Spring 58 normally retains dancer roller 54 in an upward position, but may be overcome by greater tension on the film. The mechano-electrical configuration which includes elements 39, 54, 55, 56, 57 and 58 acts to maintain a nominal and relatively steady tension on the film. Supply brake 57 is mechanically attached to the reel of cassette 52.

The film next passes by pressure roller 59, which is supported by an arm and has a spring so that pressure will be exerted by roller 59 against supply roller 60. The supply roller is mounted directly upon the shaft of supply motor 61; the motor being below plate 38. The supply motor is controlled to feed film as it is used by the functioning of supply motor control 32 of FIG. 2, as has been described. The motor may be of the multipole synchronous type, and its speed and the diameter of roller 60 arranged to feed more film than is actually required. In this way the motor runs intermittently.

The film is now fed into supply vacuum chamber 62, a relatively long and shallow rectangular volume, typically with a glass front 103, and having a depth a few thousands of an inch greater than the width of the film so that it is stabilized in position by air flow from above and below. Additionally, the rollers that feed and take the film from the chamber are positioned slightly away from the sides of the chamber so that the film does not rub along the sides of the same, to avoid scratching. A vacuum is maintained at about 20 inches of water, which pulls the film into the chamber in the form of a loop with a force of the order of 8 ounces, until the port of pressure-sensitive switch 63 is uncovered. This causes a definite rise in pressure, actuating the switch, and stopping supply motor 61. The reverse procedure takes place when the film loop becomes too short.

Switch 64 is a vacuum controlled pressure-sensitive switch mounted toward the mouth of the supply vacuum chamber that is actuated should the loop of film become dangerously short. It is electrically connected to give a warning of malfunctioning to the operator, and may also be connected to stop recording if desired. Similarly, switch 65 warns of a dangerously long loop of film.

Figure 6:
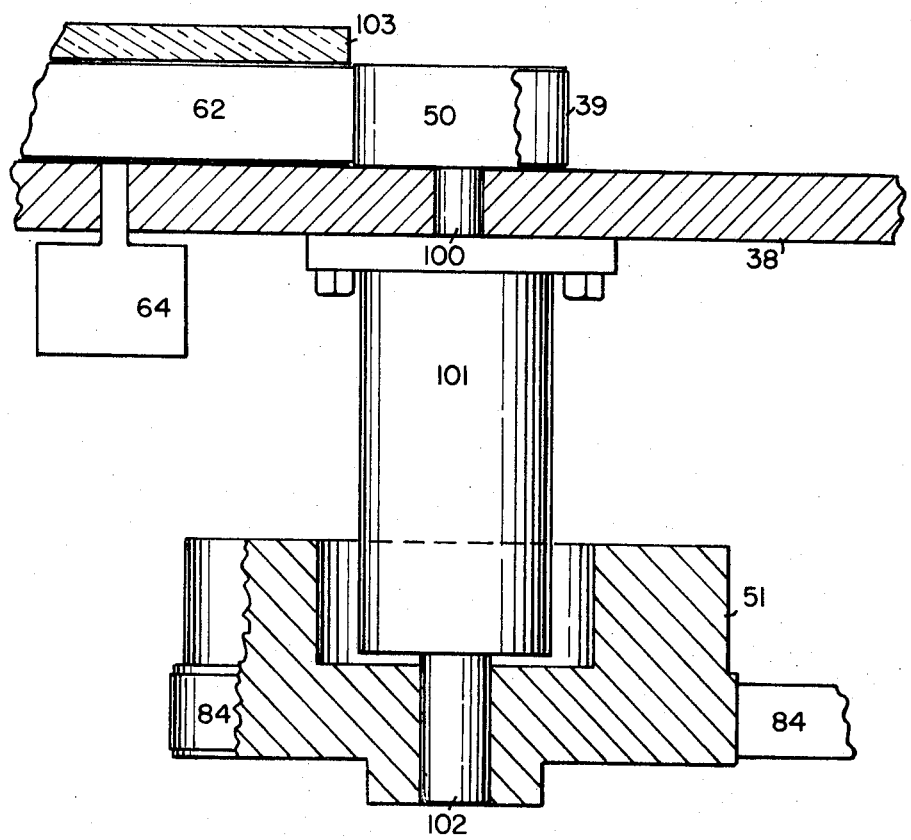
FIG. 6 is a detail of the main drive capstan, clutch/brake, and flywheel assembly.

Leaving the supply vacuum chamber the film wraps around drive capstan 50. As seen in the detail of FIG. 6, this capstan is mounted directly on magnetic clutch/brake 101. While friction clutch/brake means may be employed, the magnetic counterpart provides more accurate functioning. The magnetic device is available commercially.

Film 39 then enters takeup vacuum chamber 66, and in the same manner as in supply vacuum chamber 62 the loop is maintained at the proper length in the vicinity of vacuum switch 67, but with that switch 67 actuating takeup motor/brake 71 oppositely with respect to the control of switch 63 upon motor 61. Short-loop safety switch 68 and long-loop safety switch 69 are positioned and give an indication of malfunctioning as before.

The film is pulled out of the chamber by takeup motor/brake 71, upon which takeup reel-cassette 73 is directly mounted. The control previously described is exercised through takeup motor control 34 of FIG. 2. As capstan 50 feeds film into the takeup vacuum chamber, motor 71 pulls it out. Thus, capstan 50 sees only its own inertia and that of a few inches of film on each side of it. The pull in the chambers is equalized in both directions, so that any dynamic disturbance occurring in the chambers is minimized in its effect upon the capstan.

Directly upon leaving the takeup vacuum chamber the film runs over footage counter roller 70, which has a high coefficient of friction elastomer coated upon the periphery to insure accuracy of footage measurements. The roller and its functioning was discussed in detail in connection with footage control logic 27 of FIG. 2. From this roller the film takes a 90° twist to roller 72 and then enters takeup cassette 73; this being the equivalent of film storage magazine 16 in FIG. 1.

In the optical systems of the camera, lens 75 is an objective of good photographic quality that is mounted upon base plate 38, rigidly, but with provision for focusing. Typically, this is an 18 mm. focal length lens positioned approximately one inch from the surface of capstan 50 in an overall optical path length of 25 inches from imaging gate 44 to capstan 50. Such a configuration gives the 32 to 1 reduction in image size. In a practical embodiment the image and film flow together in synchronism with an accuracy of 1 part in 1,000.

When the film stops after an exposure, the exposure lies in a clockwise direction with respect to the imaging aperture of the film. At that time an image of indicia display (stationary) 76 is illuminated by energizing the lamps thereof for a period of 6 milliseconds. The image is of reduced size and reaches the film via mirror 76a and lens 77.

Typically solid state lamp 78, of small size and essentially but not actually in contact with film 39 at the incoming side of capstan 50, exposes a mark or equivalent upon the film, as has been previously mentioned. This is timed to occur while the film is moving and when the tail (the rear or second edge) of document 41 passes document presence detector 6 a timing ramp functions to illuminate lamp 78 at the correct time to place the mark accurately related to the image and essentially at its second edge as to the end of the mark.

Document presence detector 6 is detailed in FIG. 3, being comprised of illuminating lamp 80 and adjacent lens 81 placed above or below belt 42 to define an optical path that is obstructed by documents but not by the belt. A photosensitive cell 82, such as a phototransistor, is positioned in the optical path on the other side of the belt to receive illumination when the path is not obstructed by a document and to originate the electrical signal that is conveyed to electronic control system 7. The detector occupies a position on the approach side of imaging gate 44, typically at a fixed position of the order of four inches. For each selected speed of belt 42 there is a time interval measured in milliseconds between the detection of a document at the detector and its arrival at gate 44. This requires ramp functions capable of adjustment in timing, as has been explained in connection with control entities 24 and 25 and others of FIG. 2.

Figure 4:
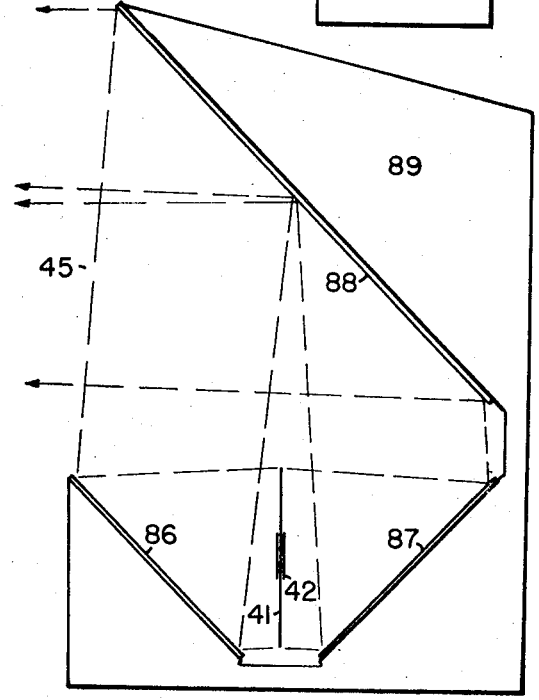
FIG. 4 is a detail on mirror reading of the documents.

FIG. 4 shows an end elevation of the mirror system for imaging the documents. This is positioned at imaging gate 44 in FIG. 3. Belt 42, having two webs, carries document 41 rapidly down through the plane of the paper of FIG. 4. The mirrors are of limited extent in this direction of document travel, Thus, illuminating lamps 46 and 47 of FIG. 3 are capable of illuminating both sides of the document when it is at the imaging gate. Front mirror 86 lies to the left of the document in FIG. 4 at an angle of 45°, while back mirror 87 lies similarly to the right. Top mirror 88 lies above these mirrors and also at an angle of 45° to the vertical. Mirror 88 is the one seen in FIG. 3 and it directs the imaging light to lens 75. The images from the front and the back of the document impinge upon film 39 at separate areas transversely across the film. All three mirrors are accurately plane first-surface mirrors and are held in mirror mount 89.

Figure 5:
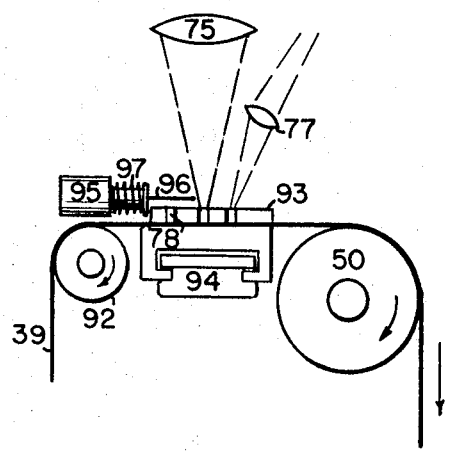
FIG. 5 is a detail of the camera shutter and an alternate film gate.

FIG. 5 gives details of a shutter that is employed in both the single capstan embodiment of FIG. 3, or the capstan and film gate embodiment of FIG. 5.

The shutter structure is comprised of solenoid 95, blade 96 and spring 97. The solenoid is fast acting. It withdraws the shutter blade from the optical path in a few milliseconds. An appropriately timed signal is produced in shutter control 36 of FIG. 2. Spring 97 is typically of the compression type and returns the blade to obstruct the optical path when the electrical excitation of the solenoid is removed. A delay circuit does not allow the shutter to return until about one second has transpired with no exposures being made. A retriggerable oscillator that provides this delay is located in mode controller 21 of FIG. 2.

In the alternate gate structure of FIG. 5, film 39 enters over idler roller 92 from supply vacuum chamber 62 and passes between aperture plate 93 and pressure plate 94. It then wraps 90° around drive capstan 50 and goes into vacuum takeup chamber 66. It has been found that a pressure of as little as one to 2 ounces will keep the film flat in the exposure area. The aperture plate has additional openings; to the left for accommodating mark lamp 78 and to the right to admit the image-forming rays of the stationary indicia.

FIG. 6 shows the detail for the drive for capstan 50, which capstan is mounted on output shaft 100 of magnetic clutch/brake 101. The stationary casing of the latter is attached to the underside of plate 38. Input shaft 102 carries combined pulley-flywheel 51. Belt 84 drives the assembly by engaging the lower pulley part of element 51.

The inertia of the pulley-flywheel is chosen so as to filter out high-frequency variations from drive capstan 50. Low-frequency variations, also known as "wows," are permitted to go through to the capstan. This is so that both the document and the film will "wow" synchronously, and so no effect will be noted in the subsequently developed photographic images.

The magnetic clutch/brake responds rapidly to electrical stimulus from the capstan brake/clutch control 24 of FIG. 2; in about 2 milliseconds for actuating or braking. When film 39 is stationary the brake is "on"; i.e., energized. As a document 41 approaches imaging gate 44, because of prior detection by document presence detector 6, the clutch is energized to drive capstan 50. This is accelerated to synchronous speed with the document, at one-thirtysecond the lineal speed because of the optical demagnification. The capstan revolves at a constant rate until the tail pulse energizes trailing edge control 20 and therethrough causes the brake to again be energized through entity 24. This stops the capstan and film within a few milliseconds. This start and stop action is repeated as long as documents pass through the imaging gate and results in a substantial saving in film.

The rapid response of the magnetic clutch/brake is obtained in large part by employing a forcing circuit to energize it. A power amplifier of a few watts output capacity provides an output voltage of, say, five times that required to force the normal current through the coil of the clutch. This is arranged by providing a resistor in series with the coil having a resistance four times that of the coil, say of 200 ohms for the resistor. This resistor is shunted by a capacitor of, say, 20 microfarads.

When the energizing voltage is applied, the capacitor presents a low impedance and so the current in the circuit rises rapidly; five times more rapidly than with a simple circuit, to a maximum value in perhaps 1½ milliseconds. However, after this desired initial surge of the current reduces rather rapidly exponentially to normal despite the continued five times normal voltage, since the circuit resistance is now five times normal. The capacitor has a high impedance to slow voltage variations or to DC, and so is not present in the circuit in a meaningful way once the initial surge is over. In this way rapid start and stop of the film is accomplished.

Figure 7:
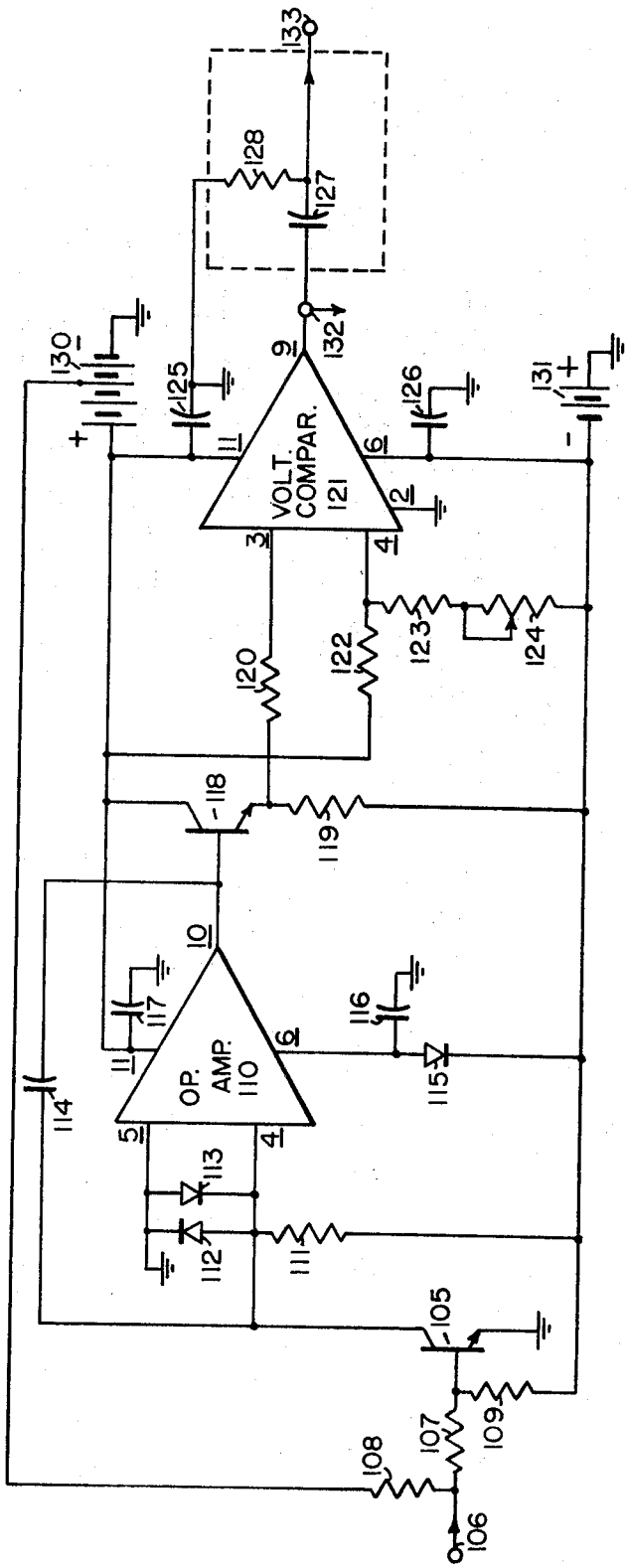
FIG. 7 is a schematic diagram of an electronic circuit significantly involved in the electronic control system.

FIG. 7 is a schematic diagram of the ramp and voltage comparator circuit. This timing circuit is significant in the electronic apparatus of FIG. 2, as has been mentioned.

The enable pulse into the ramp generator is a three-quarter volt to ground signal. This is not sufficient to forward bias transistor 105, which may be a TI 99 NPN-type; thus the transistor is turned off. The enable pulse enters via conductor 106, which connects as required in FIG. 2 where the circuit is used, as from entity 22 into entities 20 and 23, for an example. Resistor 107, having a resistance of the order of 330 ohms, is for input isolation, being in series with the input. Resistors 108 and 109 connect to opposite ends of resistor 107 and form a DC bias means for the base of transistor 105. Resistor 108 is of 220 ohms and is connected to a source of positive voltage, as a plus 5 volt tap on battery 130, for example; while resistor 109 has a resistance of 1,000 ohms and is connected to a source of negative voltage, as the minus 6 volts of battery 131, for example. The common terminals of resistors 107 and 109 connect to the base of transistor 105. The emitter thereof is connected to ground and the collector to input pin 4 of a Fairchild μA741 operational amplifier 110, or equivalent.

Pin 4 is also connected to minus 6 volt source 131 through resistor 111, of 220,000 ohms resistance. Further, pin 4 is connected to oppositely poled diodes 112 and 113, the second terminal of each being connected to ground. These diodes clip the input voltage between the limits of approximately minus 0.6 volt to plus 0.6 volt. Pin 5 of the amplifier is also connected to ground.

The output terminal, pin 10, of amplifier 110 is connected to capacitor 114, of 0.1 mf., capacitance, and also to input pin 4. This provides a feedback path. When transistor 105 is not conducting the potential of pin 4 drives toward minus 6 volts. The output at pin 10 is simultaneously driven positive, and feedback occurs through capacitor 114. Because of the time constant of the circuit feedback occurs gradually, forming a strictly linear long ramp, or variation of voltage with time.

The time constant of the ramp is determined by the capacitance of capacitor 114 and the resistance of resistor 111. The linear output is generated at output pin 10 of amplifier 110. The ramp has a maximum excursion of from minus 5½ to plus 12 volts in an embodiment having a 12 volt power supply. This corresponds to a time interval of 45 milliseconds with the component values that have been given. How much of this range is used depends upon the voltage setting of the voltage comparator, to be described. This is related to the speed chosen for document translator 1; the higher the speed the shorter section of ramp is used.

Subsidiary connections to operational amplifier 110 include the connection of pin 6 to a source of minus 6 volts 131 through diode 115, the anode of which is connected to the pin, and also to bypass capacitor 116, of 0.01 mf., capacitance, to ground. The diode prevents a positive voltage from ever appearing at pin 6 through an accident or malfunctioning of the supply source. This is a safety circuit to prevent serious damage to amplifier 110. The bypass capacitor forms a relatively high frequency filter for preventing unwanted spikes, pulses or similar interference from the power supply source from entering the amplifier.

Pin 11 of amplifier 110 is connected directly to source of plus 12 volts 130, with bypass capacitor 117 of 0.01 mf., connected to ground.

The ramp elements are isolated from the following voltage comparator elements by emitter-follower transistor 118, which may also be a TI 99 NPN. The base thereof is connected directly to output pin 10 and the collector to the source of plus 12 volts 130. The emitter is connected to the source of minus 6 volts 131 through resistor 119, of 1,500 ohms.

The output is taken from the emitter and is connected through resistor 120 of 1,000 ohms to pin 3 of voltage comparator amplifier 121. This may be a Fairchild µA710C, or equivalent. The output of this comparator changes state from approximately ground potential to approximately plus 5 volts, depending upon the voltage differential between pins 3 and 4, the inputs. As shown, pin 4 receives a reference voltage, derived from a voltage divider composed of resistor 122, of 2,200 ohms, resistor 123, of 220 ohms, and rheostat 124 having a maximum resistance of 5,000 ohms. The first terminal of resistor 122 is connected to plus 12 volt source 130 and the second terminal is connected to pin 4 of the amplifier. Resistor 123 and rheostat 124 are serially connected between pin 4 and source of minus 6 volts 131.

The resistance of rheostat 124 is adjusted until the voltage of pin 4 is set at a value corresponding to the time interval desired for the particular application of the ramp in the apparatus. When the voltage at pin 3 of amplifier 121 exceeds that at pin 4 by a small increment, of the order of 5 to 10 millivolts, then output terminal 132, at pin 9, switches from ground potential to approximately plus 4 or 5 volts, depending upon the load.

Pin 11 of amplifier 121 connects directly to source of plus 12 volts 130, with bypass capacitor 125 connected therefrom to ground, with a capacitance of 0.01 mf. Pin 6 similarly connects to a source of minus 6 volts 131 and to bypass capacitor 126 of 0.01 mf. capacitance.

The above input connections give a noninverting output, a positive voltage input gives a positive voltage output. The ramp is in the positive direction of voltage. Conversely, for an inverting output, a negative voltage output for a positive voltage input, the connections to pins 3 and 4 are reversed.

If a sharp pulse instead of a step function is desired, as for the "on" and "off" circuits of moving indicia control 25 and indicia display control 26, then output terminal 132 is connected to the differentiating network within the dotted rectangle in FIG. 7. This is comprised of a series capacitor having small capacitance 127, with a typical capacitance of 150 m.m.f. and shunt resistor 128, of 100 ohms, connected to ground. A positive pulse is obtained at output terminal 133 with the circuit as shown. A negative pulse is obtained with inputs 3 and 4 reversed and resistor 128 returned to the plus 5 volt tap on battery 130 instead of to ground.

Batteries 130 and 131 may be replaced by regulated power supplies.

In leading edge control 23, of FIG. 2, there are two ramp circuits; one for generating the controls for the capstan brake/clutch, to deenergize the brake and to energize the clutch, and a second one for generating a false trailing edge in case there appears to be a document longer than 27 inches. This gives an override control if document presence detector should fail in this regard.

In trailing edge control 20 there is a first ramp circuit with voltage comparator according to FIG. 7 for energizing the brake and deenergizing the clutch. Connected to the output of this first ramp is a voltage comparator for turning the mark lamp "on" and another for turning the same "off." More than one voltage comparator may be connected to one ramp circuit by employing an isolating amplifier 118 for each such connection. These comparators are in indicia (moving) control 25. Also, there is another ramp circuit to drive two voltage comparators, one for turning "on" the (stationary) indicia display control 26, and a second one for turning the same "off."

The time interval metered by the ramp - voltage comparator circuits depends upon the functions involved and also according to which of the speeds of document translation is involved.

One function that does depend upon document speed is the brake deenergize/ clutch energize command. This takes 12 milliseconds (ms.) at 300 inch/sec.

Taking the 300 inch/second document speed as an example and a distance of 4.8 inches from the document presence detector 5 to the leading edge of the photographing aperture (imaging gate 44) the traverse of a leading edge for this distance requires 14 ms. For a 5 inch length of document the brake energize/ clutch deenergize time interval is 17.7 ms. The failsafe provision for a trailing edge step function at the equivalent of a 27" long document employs a 106 ms. time interval. To produce the moving indicium of 0.080 inch the lamp is turned "on" at 8¼ ms and "off" at 16¾ ms. The stationary indicia illumination is turned "on" at 20.65 ms. and "off" at 26.65 ms. for the typical 6 ms. exposure.

While a number of electronic computers may be employed for entity 4, the Digital Equipment Co. type PDP-8 is typical. Programmable means 4a may be programmed to provide exposure-inhibiting commands on any aspect of the information read at reading station 5; viz, minimum dollar amount, unwanted customer number sequence, etc. The command is forwarded to enabling means 4b, internal of the computer, from which an electrical pulse is the external output. The reception of such a pulse by electronic control system 7 inhibits exposure of film 39 by closing an otherwise open gate for the period required to inaugurate the sequence for the exposure of a document.

It will also be understood that the connection from the computer to electronic control 7 may be reversed; that an enabling pulse is required from the computer in order to make an exposure of a document.

Computer entity 4, including its programmable means, may be embodied in merely a punched or marked card reader or similar device, which provides selective data as to whether specific documents shall or shall not be recorded on film.

We claim:
1. An opto-electronic camera system comprising;

a. first mechanical means (1) to sequentially translate plural documents (41),
b. second mechanical means (11, 12) to translate and expose an unexposed film strip (39) while in motional synchronism with the translation of selected said plural documents on an individual basis,
c. first and second additional means (17,18) coactive with said second mechanical means to additionally expose plural types of identifying indicia upon each exposure of a said document upon said film strip,
said first additional means (17) to expose one said type while said film strip is moving, and
said second additional means (18) to expose another said type while said film strip is stationary,
d. an electrical computer (4) having data programmable means (4a), and
e. an electronic control system (7) to read data electrically connected to and coactive with said computer and with said first mechanical means to selectively sense which documents shall be exposed upon said film strip by said second mechanical means.

2. The camera system of claim 1, in which;
a. said data programmable means (4a) is a memory device,
b. said first mechanical means includes means (5) to read data from each of said documents, and
c. said electronic computer (4) includes enabling means (4b) coactively connected to said control system (7) to schedule an exposure of such documents as meet the requirements of said data programmable means by producing an electrical output.

3. The camera system of claim 1, which includes;
a. an optical register (76), computer controlled to expose human-readable indicia upon said film strip when said film strip is stationary.

4. The camera system of claim 1, which includes;
a. optical means (17) to expose a mark upon said film strip when said film strip is moving.

5. The camera system of claim 4, which additionally includes;
a. a connection from said electronic control system (7) to said optical means (17)
for the control thereof by said electronic control system, and
b. a connection from said electronic control system (7) to said second mechanical means (12,11)
for the control thereof by said electronic control system, whereby each said mark upon the film strip is in fixed spatial relationship to an adjacent exposure of a selected document upon said film strip.

6. The camera system of claim 1, which includes;
a capstan (50) carrying exposable film,
b. apertured image means (75) radially disposed with respect to said capstan to expose an image of a said selected document upon said film,
c. optical means (78) disposed away from said image means circumferentially around said capstan toward the incoming film to expose a mark upon said film, and
d. an optical registry imaging assembly (76, 76a, 77) disposed away from said image means circumferentially around said capstan away from the incoming film to expose readable indicia upon said film.

7. The camera system of claim 6, in which;
a. said optical means (78) is disposed in near-contact to the surface of said film and has a dimension transverse to said film substantially the same as the transverse dimension of said mark upon said film.

8. The camera system of claim 7, in which;
a. said optical means (78) is a solid state lamp.

9. The camera system of claim 1, which additionally includes;
a. an electromechanically actuated shutter (96) disposed with respect to said second mechanical means to prevent exposure of said film strip when said shutter is in a closed position,
b. automatic means (95) to open said shutter prior to any selected said document being presented for exposure upon said film strip, and
c. automatic means (36, 97) to close said shutter after a time-interval corresponding to that required for the presentation of a plurality of selected said documents, during which time-interval no such document is presented.

10. The camera system of claim 1, which additionally includes;
a. a first electrical circuit (111, 114) for generating a ramp function,
b. a second electrical circuit (121) connected to said first electrical circuit to terminate said ramp function at a selected time,
c. opto-electrical means (6,106) to inaugurate the generation of said ramp function upon the presence of a document to be exposed, and
d. electrical reference means to adjust (122, 123, 124) said second electrical circuit to terminate said ramp function at the time the said document is to be exposed by said second mechanical means.

11. The camera system of claim 10, in which;
a. said first electrical circuit generates a ramp function of voltage, and
b. said second electrical circuit is a voltage comparator (121) which produces an electrical output at a selected value of voltage to terminate said ramp function.

12. The camera system of claim 11, which additionally includes;
a. means (37') to selectively adjust the speed of translation of documents by said first mechanical means, and
b. said means to adjust (122, 123, 124) said second electrical circuit includes predetermined adjustments corresponding to the speeds of translation of said documents.

* * * * *